United States Patent
Schlichter et al.

(10) Patent No.: US 9,004,106 B2
(45) Date of Patent: Apr. 14, 2015

(54) SWITCHING APPARATUS FOR A FLUID FLOW

(75) Inventors: Bernhard Schlichter, Saarbrücken (DE); Manfred Deutschmeyer, Perl (DE)

(73) Assignee: Hydac Process Technology GmbH, Neunkirchen (DE)

( * ) Notice: Subject to any disclaimer, the term of this patent is extended or adjusted under 35 U.S.C. 154(b) by 193 days.

(21) Appl. No.: 13/261,531

(22) PCT Filed: Jun. 10, 2011

(86) PCT No.: PCT/EP2011/002852
§ 371 (c)(1),
(2), (4) Date: Nov. 29, 2012

(87) PCT Pub. No.: WO2011/160780
PCT Pub. Date: Dec. 29, 2011

(65) Prior Publication Data
US 2013/0068979 A1   Mar. 21, 2013

(30) Foreign Application Priority Data

Jun. 25, 2010   (DE) .......................... 10 2010 025 153

(51) Int. Cl.
| | |
|---|---|
| F16K 11/20 | (2006.01) |
| F16K 11/22 | (2006.01) |
| B01D 35/12 | (2006.01) |
| B01D 35/30 | (2006.01) |
| F16K 31/44 | (2006.01) |

(52) U.S. Cl.
CPC ................ *F16K 31/44* (2013.01); *B01D 35/12* (2013.01); *F16K 11/20* (2013.01)

(58) Field of Classification Search
CPC ....... F16K 11/20; F16K 11/22; F16K 11/202; F16K 31/44; F16K 35/14; E03C 1/023; B01D 2273/16; B01D 35/12; B01D 35/30; B01D 46/002
USPC ........ 137/637, 637.1, 883, 887, 637.2, 637.3; 210/340, 341
See application file for complete search history.

(56) References Cited

U.S. PATENT DOCUMENTS

| | | | |
|---|---|---|---|
| 746,896 A | 12/1903 | Stott | |
| 844,438 A * | 2/1907 | Bayley | ........................... 210/252 |
| 1,654,355 A * | 12/1927 | Webb | .............................. 134/199 |
| 1,898,569 A * | 2/1933 | Pearson | ...................... 137/637.1 |

(Continued)

FOREIGN PATENT DOCUMENTS

| | | |
|---|---|---|
| DE | 600 05 552 T2 | 4/2004 |
| GB | 162 116 | 4/1921 |

(Continued)

*Primary Examiner* — John Fox
*Assistant Examiner* — Seth W MacKay-Smith
(74) *Attorney, Agent, or Firm* — Roylance, Abrams, Berdo and Goodman LLP

(57) ABSTRACT

A switching apparatus for a fluid flow with a first fluid-conducting connection (5) and a second fluid-conducting connection (6) between first and second treatment devices (3, 4) has a first pair of switching levers (11, 12) assigned to first and second distributor valves (7, 8) and a second pair of switching levers (15, 16) assigned to third and fourth distributor valves (13, 14) arranged in different planes. The switching levers (11, 12) of the first pair can be actuated by an operator without obstruction with the switching levers (15, 16) of the second pair, and vice versa.

12 Claims, 9 Drawing Sheets

(56) References Cited

U.S. PATENT DOCUMENTS

| | | | |
|---|---|---|---|
| 2,489,362 A * | 11/1949 | Bastrup | 210/249 |
| 2,685,276 A * | 8/1954 | Dyken | 91/31 |
| 2,921,687 A * | 1/1960 | Jenkins | 210/341 |
| 3,679,060 A * | 7/1972 | Smith | 210/333.1 |
| 3,792,612 A * | 2/1974 | Lammel et al. | 73/864.34 |
| 3,935,108 A * | 1/1976 | Forgues | 210/340 |
| 4,281,683 A * | 8/1981 | Hetherington et al. | 137/606 |
| 4,336,919 A | 6/1982 | Hall | |
| 4,429,711 A * | 2/1984 | Schomer | 137/385 |
| 4,496,463 A * | 1/1985 | Desai et al. | 210/341 |
| 4,611,626 A | 9/1986 | Logsdon | |
| 4,823,843 A * | 4/1989 | Golembiski | 137/637.1 |
| 5,073,260 A * | 12/1991 | Wilkendorf | 210/238 |
| 5,383,491 A * | 1/1995 | Heilman | 137/597 |
| 5,628,339 A * | 5/1997 | Isringhausen | 137/269 |
| 5,779,771 A * | 7/1998 | Wooten et al. | 96/124 |
| 5,893,969 A * | 4/1999 | Goldman | 210/95 |
| 6,558,554 B1 * | 5/2003 | Jones et al. | 210/739 |
| 6,668,860 B1 * | 12/2003 | Pas et al. | 137/599.14 |
| 6,935,913 B2 | 8/2005 | Ward | |
| 7,223,298 B2 * | 5/2007 | Platt et al. | 95/286 |
| 7,896,959 B1 * | 3/2011 | Schopf, Jr. | 96/417 |
| 2002/0023685 A1 * | 2/2002 | Pas et al. | 137/887 |

FOREIGN PATENT DOCUMENTS

| | | |
|---|---|---|
| GB | 2 236 829 A | 4/1991 |
| WO | WO 01/29467 A1 | 4/2001 |

* cited by examiner

SWITCHING APPARATUS FOR A FLUID FLOW

FIELD OF THE INVENTION

The invention relates to a switching apparatus for a fluid flow, in particular for conducting a high pressure fluid from a first treatment device to a second treatment device. The fluid can then be subjected to a chemical and/or physical process step in each treatment device.

BACKGROUND OF THE INVENTION

DE 600 05 552 T2 discloses a switching device conforming to its genre. In this case, a high pressure fluid can be conducted selectively through a first treatment device or a second treatment device, in which devices the fluid experiences a treatment, such as a filtration operation. For this purpose, the two treatment devices can be connected to each other by first and second fluid-conducting connections. According to the solution known from the prior art, an outlet valve that is intended for the treated fluid is provided in an approximately centered manner in the first fluid-conducting connection. An inlet valve that is intended for the untreated fluid is provided in an approximately centered manner in the second fluid-conducting connection. A safety valve is provided on both sides adjacent to the inlet and the outlet valve in the two fluid-conducting connections. The safety valve can supply the treatment devices with the fluid, supplied by the inlet valve. With respect to the other fluid-conducting connection, the treated fluid can be fed from the treatment devices to the outlet valve. In the known solution, the inlet valve and the outlet valve as well as the two safety valves, which are assigned in pairs to the two treatment devices, are connected together in each instance by a shaft that couples the valve pairs. To change the switching position of the valve elements disposed in the valves, a switching lever is connected to the respective shaft. The shafts can be rotated by the respective switching lever. The shafts are positively coupled by connecting link guides in such a way that the valve pairs can be actuated only in a predefined order of sequence. In the prior art solution, both the coupling shafts and the fluid-conducting connections that are provided for arranging the valves must satisfy high quality requirements with respect to the tolerance during production and assembly. The valves that are coupled together in each instance are then arranged exactly coaxially to the shaft and can be actuated by an operator with as little obstruction as possible.

SUMMARY OF THE INVENTION

An object of the present invention is to provide an improved switching device that is intended for a fluid flow and that is easy to produce and assemble, and yet ensures reliable operation, in particular a reliable coupling of the movement of valve pairs.

That object is basically achieved with a switching device having a first pair of switching levers, which are assigned to the first and second distributor valves, and a second pair of switching levers, which are assigned to the third and fourth distributor valves, that are arranged in different planes. The switching levers of the first pair can then be actuated by an operator without being impeded by the switching levers of the second pair and vice versa. The switching positions of the valve elements of the distributor valves can be changed in a reliable way by an operator even if a coupling shaft is not provided between the first and third distributor valves or between the second and fourth distributor valves, respectively. Due to the fact that the switching levers are arranged in pairs in different planes, the switching levers of the first pair can be actuated without being impeded by the switching levers of the second pair, and vice versa.

In one embodiment, the first and the second pair of switching levers for actuating the respectively assigned pair of distributor valves from a fluid-passing position into a fluid-blocking position and vice versa define a first pivoting range. The first pivoting range is assigned to the first pair of switching levers. A second pivoting range is assigned to the second pair of switching levers. These two pivoting ranges can partially overlap in the projection. Since the first pair of switching levers and the second pair of switching levers are arranged in different planes, each of the two pairs can enter in a collision-free manner into the pivoting range of the respective other pair of switching levers in any actuating position. This arrangement ensures that the switching device can be reliably actuated even in the presence of large pivoting ranges. Even in the case of spatially expanded switching levers, for which the operator does not have to apply as much force, the collision-free and reliable operability of the switching device is then ensured.

In one embodiment, the switching levers of the first pair and the switching levers of the second pair are arranged in such a manner that both switching levers of a pair can be jointly actuated over the entire pivoting range with one hand of an operator. As a result, a simple operability is achieved, in particular, an operability that enables an efficient and speedy actuation by the operator despite the use of two switching levers for an assigned pair of distributor valves. The result of a joint actuation with one hand is a positive coupling of the movement of the valve elements of a pair of distributor valves, so that separate means, such as shafts, are not necessary to achieve a coupling.

One embodiment provides that the switching levers to be actuated by the operator are designed ergonomically in their grip region. Rounded-off shapes of the free ends of the switching levers lend themselves especially well for this purpose. To facilitate the joint actuation of the switching levers of a pair, provision can be made such that the switching levers that are to be jointly actuated have a formation that is approximately hemispherical in shape. The switching levers of a pair that are to be grasped by one hand are then complemented to form a spherical shape in their grip region that can be grasped in an easy and secure way by the hand of the operator.

In one embodiment, the switching levers have in each instance a spacer section that is bent relative to the free ends of the switching levers and that extends more or less in the direction of the axis of rotation of the assigned distributor valve, in order to arrange the switching levers in different planes. Starting from the free end of the switching lever, which can be grasped by an operator as a kind of grip region, a switching lever has initially an oblong section that extends more or less in a plane perpendicular to the axis of rotation of the assigned distributor valve. Then, the oblong section merges with the bent spacer section, which bent section has a length that can be selected as a function of the requirements. Attached to the bent spacer section is another section of the switching lever that is designed to be fastened to the assigned distributor valve. This section of the switching lever in turn can be bent, as desired. Due to the fact that the plane in which the pivoting range of a switching lever is arranged in the switching device according to the invention and is defined in essence by the longitudinal dimension of the associated spacer section, it is possible to achieve a cost-effective adaptability of the position of the pivoting range without having to resort to the other components of the switching device.

In one embodiment, the spacer sections of the switching levers of a pair have a varying longitudinal extension. In this case, the sum of the two spacer sections can be chosen such that the two switching levers of a pair are adapted to the geometric dimensions of the switching device, in particular to the distance between the assigned distributor valves.

In one embodiment, the switching levers are designed in each instance as two-armed levers for grasping by the operator. The two arms of the lever are arranged diametrically opposite each other in relation to the axis of rotation of the assigned distributor valve. Designing the switching levers as two-aimed levers allows the switching levers to be actuated from two sides of the switching device. In particular, when the two-armed lever is designed symmetrically, the lever is in equilibrium relative to its central point of rotation. This state makes mounting the lever on the assigned distributor valve easier and allows the lever to be actuated with negligible impedance.

In one embodiment of the switching device according to the invention, the one switching lever of the first pair is designed as an identical part of a switching lever of the second pair. The other switching lever of the first pair is designed as an identical part of the other switching lever of the second pair. Since this feature reduces the number of different parts, this solution offers not only a cost advantage during the production of the switching device according to the invention, but it also simplifies the assembly process.

In one embodiment of the switching device according to the invention, a fifth valve is arranged between the first and third distributor valves in the first fluid-conducting connection. A sixth valve is arranged between the second and fourth distributor valves in the second fluid-conducting connection. Preferably, the sixth valve for feeding the untreated fluid to the switching device is designed as an inlet valve, whereas the treated fluid can issue again from the switching device by the fifth valve designed as an outlet valve.

In one embodiment, the fifth valve and the sixth valve can be actuated by a shaft that couples said fifth and sixth valves. An additional switching lever engages with the shaft. Due to the additional switching lever being arranged in a plane that is different from the planes of the pivoting ranges of the first pair of switching levers and the second pair of switching levers, the pivoting range of this additional switching lever can enter in a collision-free manner into the pivoting range of the first pair of switching levers and the second pair of switching levers. At the same time, the coupling shaft ensures that the fifth valve and the sixth valve are automatically actuated together.

For this purpose, the pivoting range of the additional switching lever can be arranged between the two planes of the pivoting ranges of the first and the second pair of switching levers.

In one embodiment of the switching device according to the invention, the pivoting range of the additional switching lever is arranged in a plane that is adjacent only to the respective plane of the pivoting range of the first or the second pair of switching levers.

In one embodiment of the switching device according to the invention, the additional switching lever for jointly actuating the fifth and the sixth valve is designed as a rod and at least partially penetrates, guided in a receptacle, the shaft transversely to the longitudinal extension of said shaft. The additional switching lever can then be moved into the opposite operating positions. In one embodiment, the receptacle is designed in its cross section to correspond to the cross section of the shaft that is designed as a rod. In particular, in the case of a shaft having a circular cross section, a corresponding passage borehole transversely to the longitudinal extension of the shaft is provided as the receptacle in this shaft.

In one embodiment of the switching device according to the invention, from the process side of the switching device, the inflow of fluid can be controlled by the sixth valve in the second fluid-conducting connection. The switching levers of the first, second, third, and fourth distributor valves as well as the additional switching lever of the fifth and sixth valves can be actuated by an operator from the operator side of the switching device that is located opposite the process side. The lines that are provided on the process side for supplying the untreated fluid or for discharging the treated fluid do not impede an operator from actuating the switching levers.

The switching device according to the invention can also be designed such that the first, second, third, and fourth switching levers as well as the additional switching lever can be accessed by an operator from the process side, especially if on the process side of the switching device the lines for supplying the untreated fluid or for discharging the treated fluid are arranged in a suitable way that the operator is not impeded.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
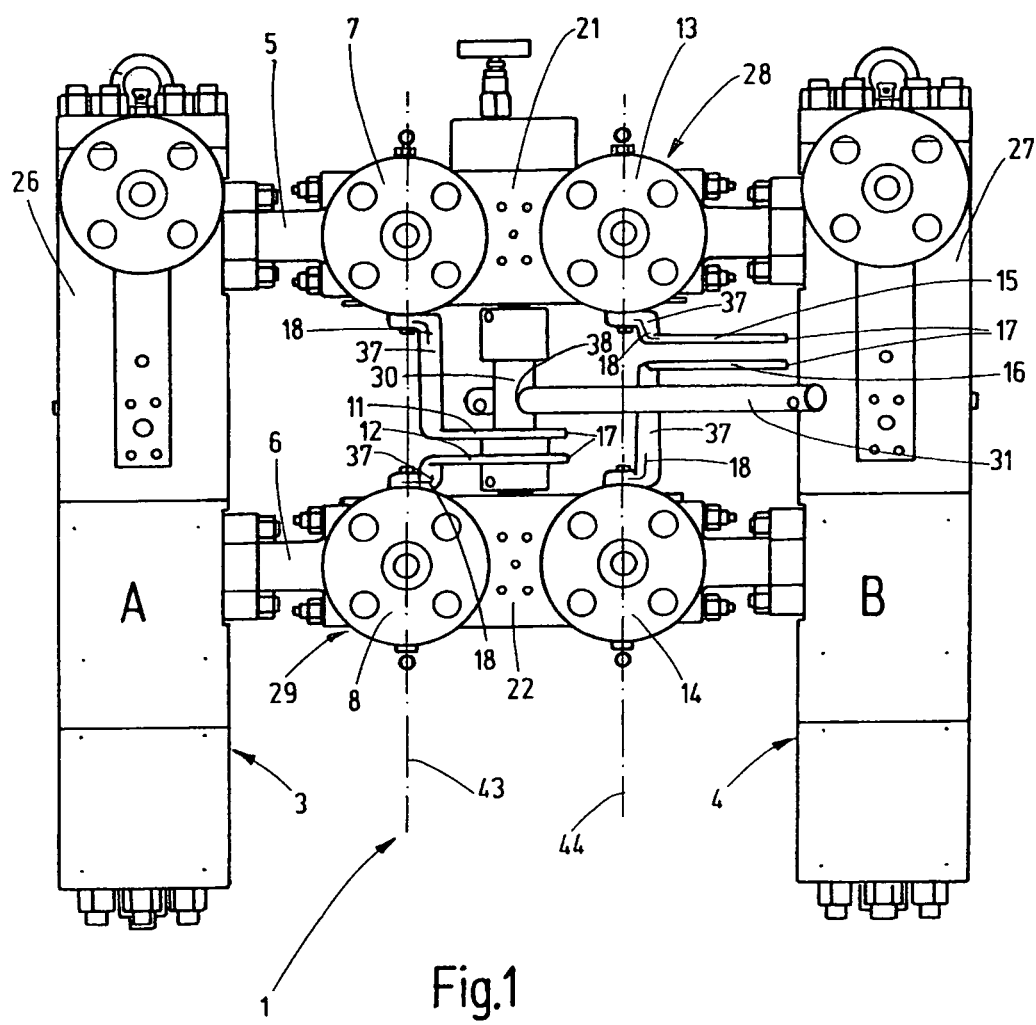
FIG. 1 is a side elevational view of a switching device for a fluid flow, in particular for conducting a high pressure fluid in two treatment devices, according to a first exemplary embodiment of the invention.

FIG. 1 shows an exemplary embodiment of a switching device 1 for conducting a fluid 2, which fluid is a liquid or gaseous process flow that is to be filtered. This process flow can also contain aerosols. The fluid 2 can be conducted selectively into first and second treatment devices 3 (A) and 4 (B). In the illustrated exemplary embodiment, the treatment devices 3, 4 are designed in each instance with a filter housing. These two filter housings contain suitable filter elements. In this case, the switching device 1 is used, in particular, to control the inflow of fluid 2, through a valve 22 selectively into the first treatment device 3 or into the second treatment device 4.

The treatment devices 3, 4 can be connected to each other in a fluid-conducting manner or in fluid communication by a first fluid-conducting connection 5 and a second fluid-conducting connection 6 or can be separated again from each other. The fluid-conducting connections 5, 6 are arranged between the respective pressure-tight housings 26, 27 of the first treatment device 3 and the second treatment device 4 as pressure-tight pipelines with bolted flanges. The first fluid-conducting connection 5 serves to discharge filtered fluid 2, whereas the second fluid-conducting connection 6 is provided to feed unfiltered fluid 2 into the one or the other treatment device 3, 4.

The discharge of filtered fluid is performed by a valve 21, which valve is arranged in a centered manner in the first fluid-conducting connection 5. Similarly, the valve 22 is arranged in a more or less centered manner in the second fluid-conducting connection 6. In particular, the two valves 21, 22 may be found in a valve block 28, 29, each of which comprises two laterally adjacent distributor valves. In the first fluid-conducting connection 5, both sides of the valve 21 have a first distributor valve 7 and a third distributor valve 13, both of which are arranged in the valve block 28. In the second fluid-conducting connection 6, each side of the valve 22 has a second distributor valve 8 and a fourth distributor valve 14, both of which are arranged in the additional valve block 29. The distributor valves 7, 13 and 8, 14 are provided with valve elements 9, 10, 39, 40, which valve elements are designed as spherical segments. These valve elements have passage openings 19, 20, 41, 42 that are designed in each instance in the shape of a T (cf. FIGS. 3 to 9).

The first and second distributor valves 7, 8 are adjacent to the first treatment device 3 and are assigned to it in the sense that they can block or open the respective fluid-conducting connections 5, 6 to the first treatment device 3. The third and fourth distributor valves 13, 14 are assigned to the second treatment device 4 in the same operating mode. When the distributor valves 7 and 8, assigned to the treatment device 3, or the distributor valves 13 and 14, assigned to the treatment device 4, are in the blocked state, the treatment devices 3 or 4 can be emptied or used for process steps other than the passage of fluid, such as for repair and maintenance work, for changing the process management elements, such as the filters, and the like.

In addition to the discharging function of fluid or cleaning agents or the like processing substances, the fifth valve 21 also has the task, together with an integrated needle valve 36, of balancing the pressure in preparation for the switchover from one treatment device to the other treatment device in the fluid-conducting connections 5, 6. As an alternative or in addition, such a needle valve can also be provided at the sixth valve 22. The valve elements 23, 24 of the fifth and sixth valves 21, 22 have L-shaped passage openings 25, which openings can control a switchover of the supply or discharge fluid flow from the first treatment device 3 and the second treatment device 4, respectively.

As especially clear from FIG. 1, the first, second, third and fourth distributor valves 7, 8, 13, 14 are provided with manually actuatable switching levers 11, 12, 15, 16, respectively. The switching levers 11 and 15 of the first and third distributor valves 7, 13 are screwed in a suspended manner to the respective valve element, whereas the switching levers 12, 16 are oriented inversely with respect to the switching levers 11, 15, to which the respective valve elements of the distributor valves 8, 14 are screwed from the top. Each longitudinal axis 18 of an associated switching lever is configured so as to be bent, starting from the valve element, when viewed in the direction of the respective free end 17 of the switching lever. Ma result, the free ends 17 are brought spatially close together, but do not come into contact with each other. Consequently, the respective free ends 17 of the first and second switching lever 11, 12 and the free ends 17 of the third and fourth switching lever 15, 16 can be jointly grasped with one hand and allow the switching levers to be moved in synchronism from one switching position into the other. Preferably, there are no detents that have to be overcome.

The pair of switching levers comprising the switching lever 11 assigned to the first distributor valve 7 and the switching lever 12 assigned to the second distributor valve 8 are arranged in a plane that is oriented perpendicular to a rotational axis 43 of the distributor valves 7, 8. This plane is different from the plane of the arrangement of the pair of switching levers 15, 16 that is oriented perpendicular to the rotational axis 44. In particular, it is clear from FIG. 1 that the pair of switching levers 11, 12 is arranged below the pair of switching levers 15, 16, so that the switching levers 11 and 12 can be actuated in a collision-free manner by an operator and unimpeded by the switching levers 15 and 16, and, in particular, irrespective of which position the switching levers 15, 16 occupy.

The fifth and sixth valve 21, 22, or more specifically their valve elements 23, 24, are positively coupled by a shaft 30 and can only be jointly rotated. For this purpose, the shaft 30 has an additional, manually actuatable switching lever 31, which is depicted as projecting over the same side of the switching device 1 as the other switching levers 11, 12, 15, 16. The entire switching device 1 can then be operated by an operator from one side of the switching device 1.

Figure 2:
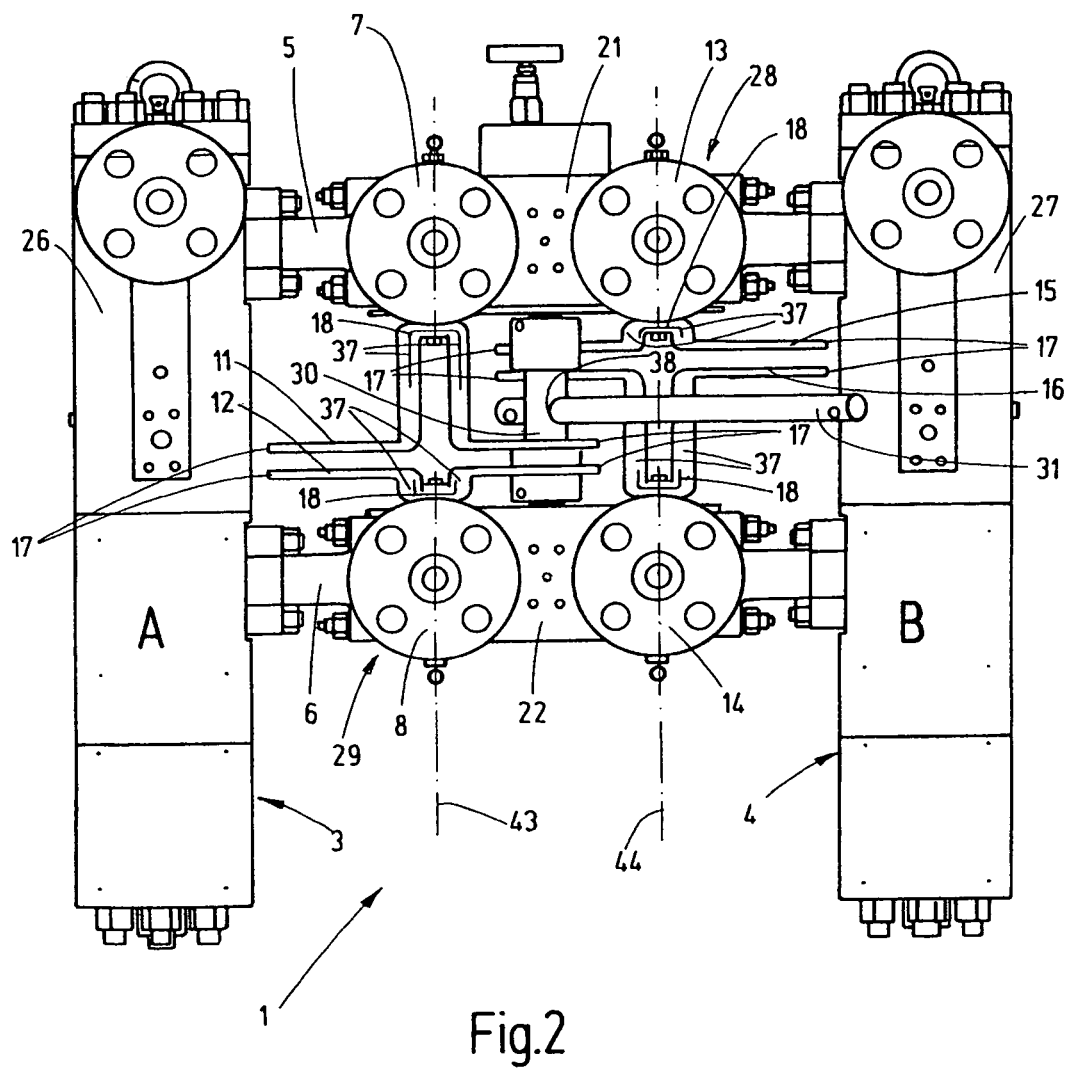
FIG. 2 is a side elevational view of a switching device for a fluid flow, in particular for conducting a high pressure fluid in two treatment devices, according to a second exemplary embodiment of the invention.

FIG. 2 shows an additional or second embodiment of the inventive switching device that has at variance with the embodiment depicted in FIG. 1, the switching levers 11, 12, 15, and 16 designed as two-armed levers. An operator can then actuate the associated distributor valves from both the operator side (shown in FIG. 2) of the switching device and also from the opposite process side. The additional switching lever 31, which at least partially penetrates the shaft 30 coupling the valves 21 and 22, can be displaced in the direction of the process side of the switching device by the receptacle 38 provided for this purpose and located in the shaft 30. Even the additional switching lever 31 can then be brought into a position in which the additional switching lever can be actuated from the process side of the switching device. The switching levers 11, 12, 15, 16 are designed symmetrically in the illustrated embodiment and are connected in their center to the associated distributor valves 7, 8, 13, 14.

The switching lever 16 of the second embodiment shall be explained in detail as one example. Starting from the attachment of the switching lever 16 at the distributor valve 14, the two symmetrically arranged spacer sections 37 extend substantially in the direction of the rotational axis 44 of the distributor valve 14 and form, as a leg together with the attachment section (not specified in detail) of the switching lever 16 at the distributor valve 14, a U-shaped structure. In this case, the attachment section is designed as a yoke that connects the legs. The two arms of the switching lever 16 that extend as far as their ends 17 are bent symmetrically at the level of the plane provided for the pivoting range of the switching lever 16. The switching lever 15 of the third distributor valve 13 is designed in an analogous manner relative to the rotational axis 44 of the distributor valve 13. In this case, when viewed in the direction of FIG. 2, the spacer sections 37 of the switching lever 15 extend downward, starting from the third distributor valve 13, so that these spacer sections, together with the attachment section of the switching lever 15, form a U-shaped structure that opens downward. The switching levers 11 of the first distributor valve 7 and 12 of the second distributor valve 8 are also designed in an analogous manner, so that the switching lever 11 is designed as an identical part of the switching lever 16. The switching lever 12 is designed as an identical part of the switching lever 15. When seen in the direction of FIG. 2, the two switching levers 11, 12 are designed symmetrically to the rotational axis 43 of the associated distributor valves 7 and 8. The U-shaped structure of the spacer sections 37 and of the attachment section of the switching lever 12 points away from the second distributor valve 8 and is open toward the top, whereas the U-shaped structure formed by the spacer sections 37 and the attachment section of the switching lever 11 points away from the associated distributor valve 7 and is open toward the bottom, when viewed in the direction of FIG. 2.

As shown in the highly simplified top views according to the drawings from FIGS. 3 to 9, the possible switchover operation from one treatment device 3 to the other treatment device 4, through actuation of the respective switching levers using in this respect cam plates 32, 33, 34, is positively coupled. The cam plates 32, 33, 34 are securely connected to the respective, assignable switching levers or valve elements and have, in each, instance, a cutout 35 in the form of a circular sector on its peripheral edge. The cutout 35 of each cam plate can interact with a peripheral edge of each adjacent cam plate, so that a rotational motion is enabled or simply blocked.

Figure 3:
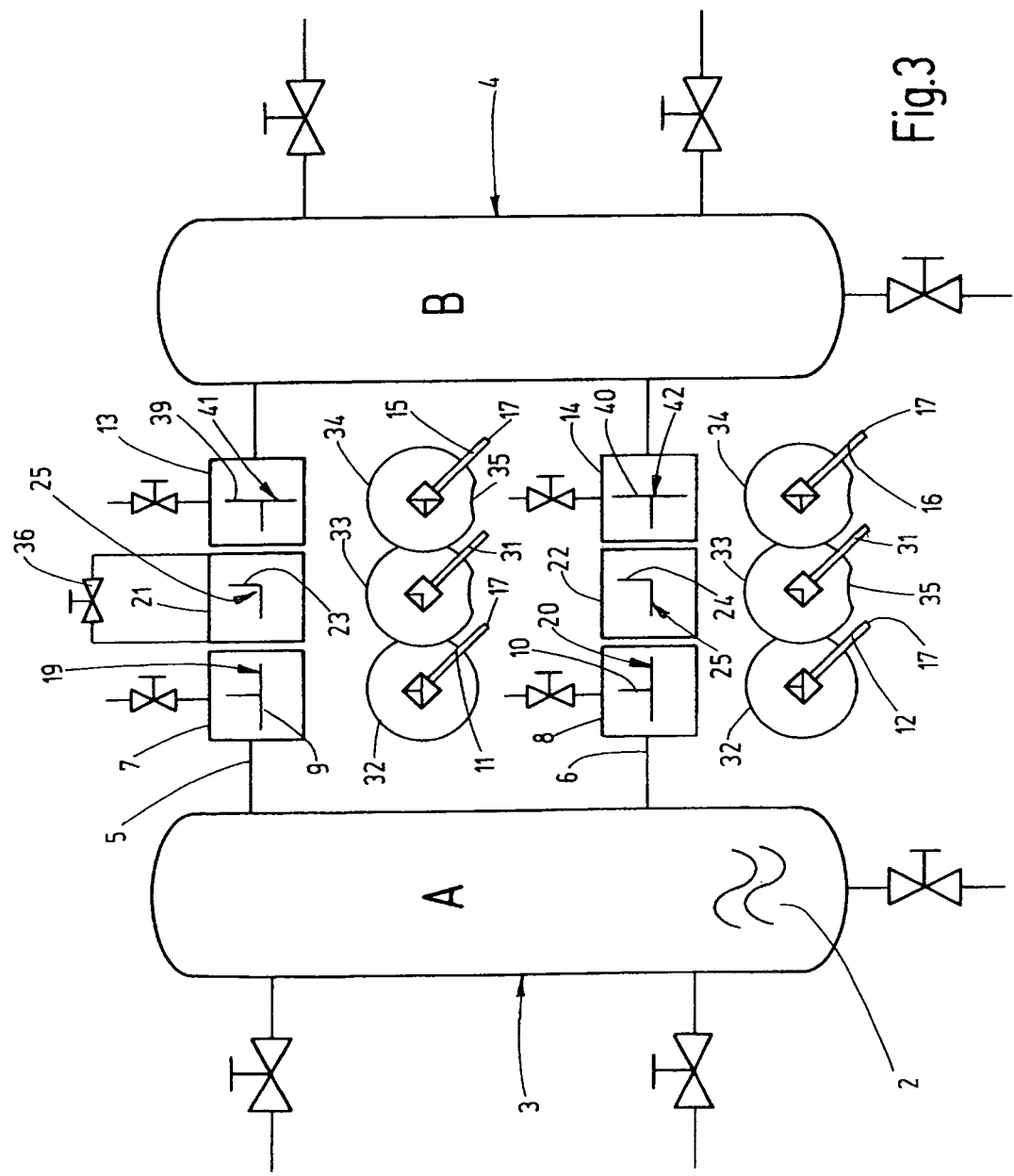
FIGS. 3 to 9 are each a schematic view of the treatment device with, in the center of each figure, a schematic top view of the switching device of in FIG. 1 in various operating phases, when the fluid flow is switched over from one treatment device to the other treatment device.

FIG. 3 shows an operating position of the switching device 1, in which the fluid 2 flows through the sixth valve 22 and the second distributor valve into the first treatment device 3. The fluid 2 leaves such a first treatment device 3 by way of the first distributor valve 7 and the fifth valve 21. The cam plates 32, 33 of the said valves are blocked by the earn plates 32 resting with their sections 35 against the peripheral edge of the cam plates 33. The second treatment device 4 is depressurized and is doubly shut off from the first treatment device 3 by the fifth valve 21 and the third distributor valve in the first fluid-conducting connection 5 as well as by the sixth valve 22 and the fourth distributor valve 14 in the second fluid-conducting connection 6 and can, for example, be serviced in such an operating phase. The orientation of the L-shaped passage opening 25 of the valve element 23 of the fifth valve 21 and the orientation of the T-shaped passage opening 41 of the valve element 39 of the third distributor valve 13 result in such a double shutoff in the first fluid-conducting line 5. Correspondingly, the orientation of the L-shaped passage opening 25 of the valve element 24 of the sixth valve 22 and the orientation of the T-shaped passage opening 42 of the valve element 40 of the fourth distributor valve 14 in the second fluid-conducting connection 6 result in a double shutoff of the second treatment device 4 in the second fluid-conducting connection 6. Therefore, in this operating phase, a replacement of filter elements (old element vs. a new element) that are not shown in detail can take place. Otherwise, the same process steps, namely a filtration operation for the fluid 2 to flow through the filter elements, are intended in both treatment devices 3, 4. If desired, a pretreatment and/or aftertreatment by a cyclone separator may be added.

Figure 4:
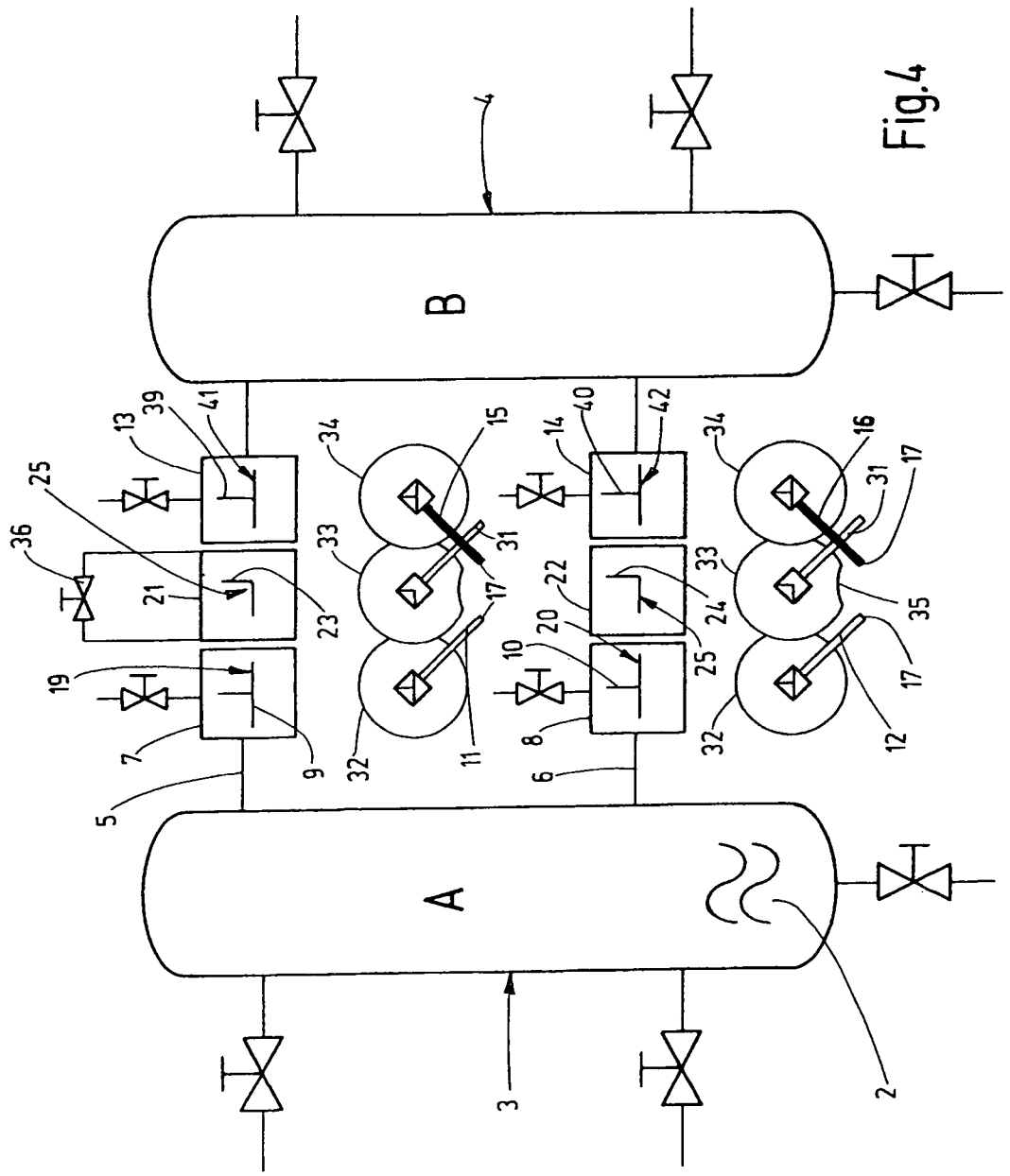

Furthermore, FIGS. 4 to 9 show the switchover procedure at the switching device 1 from the operation of the first treatment device 3 to the second treatment device 4. FIG. 4 shows the third and fourth distributor valves 13, 14 being unblocked. Their switching levers 15, 16 are jointly pivoted, when viewed in the direction of FIG. 4 to the left by an operator using one hand. It is very clear from the top view shown in FIG. 4 that the result of this arrangement is that the switching levers 15 and 16 cross over the switching lever 31. Since, however, the pair of switching levers 15, 16 is arranged in a plane that is different from that of the additional switching lever 31, such a crossing does not result in a collision of the switching levers 15, 16 with the additional lever 31. In comparison to the operating position of the switching device 1 shown in FIG. 3, the other distributor valves 7, 8 as well as the valves 21, 22 stay in their illustrated switching position.

Figure 5:
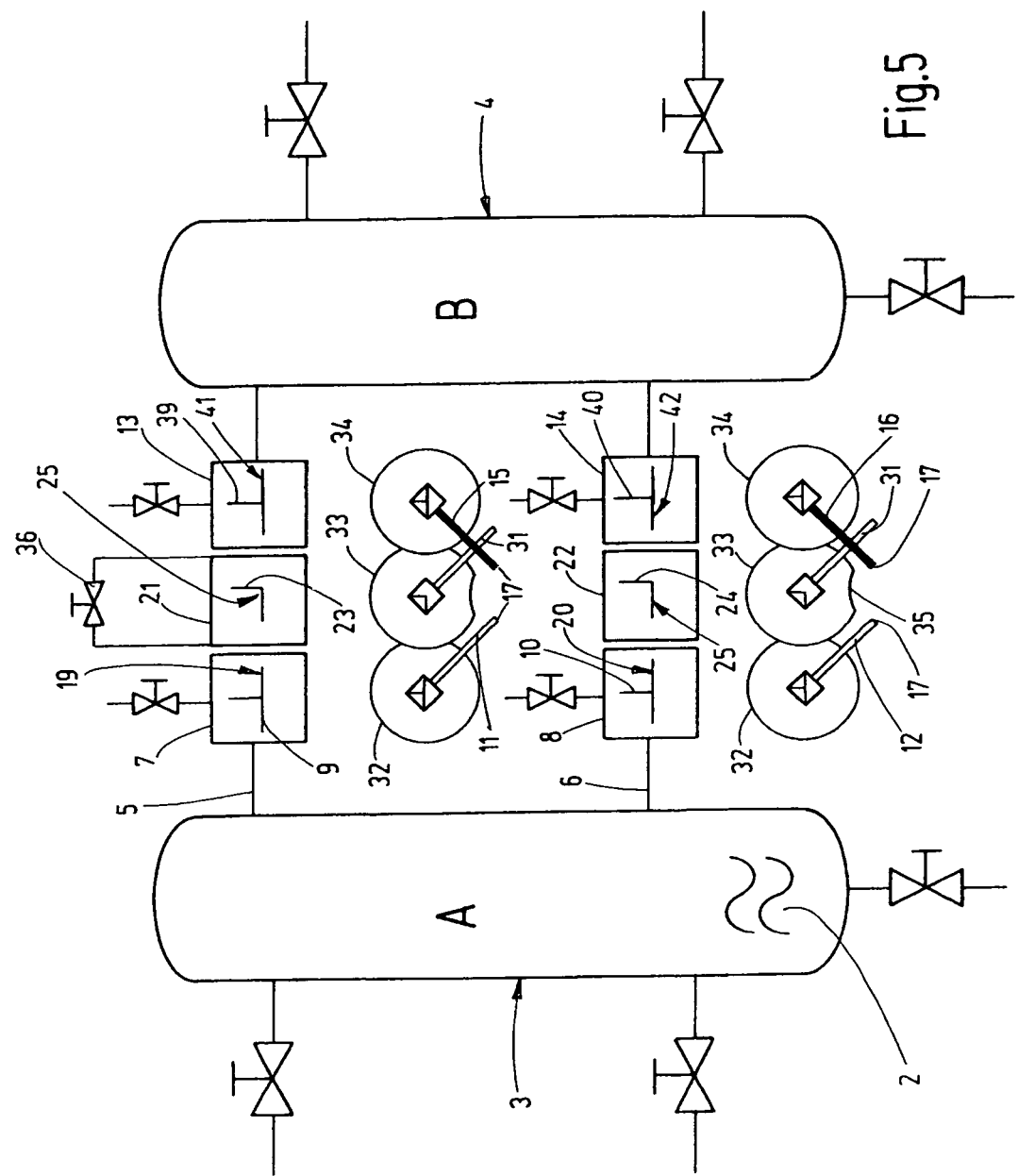

FIG. 5 shows a subsequent pressure compensation between the first treatment device 3 by the needle valve 36, which needle valve bridges the fifth valve 21. Owing to the pressure compensation, the second treatment device 4 is brought to the operating pressure and filled with fluid 2.

Figure 6:
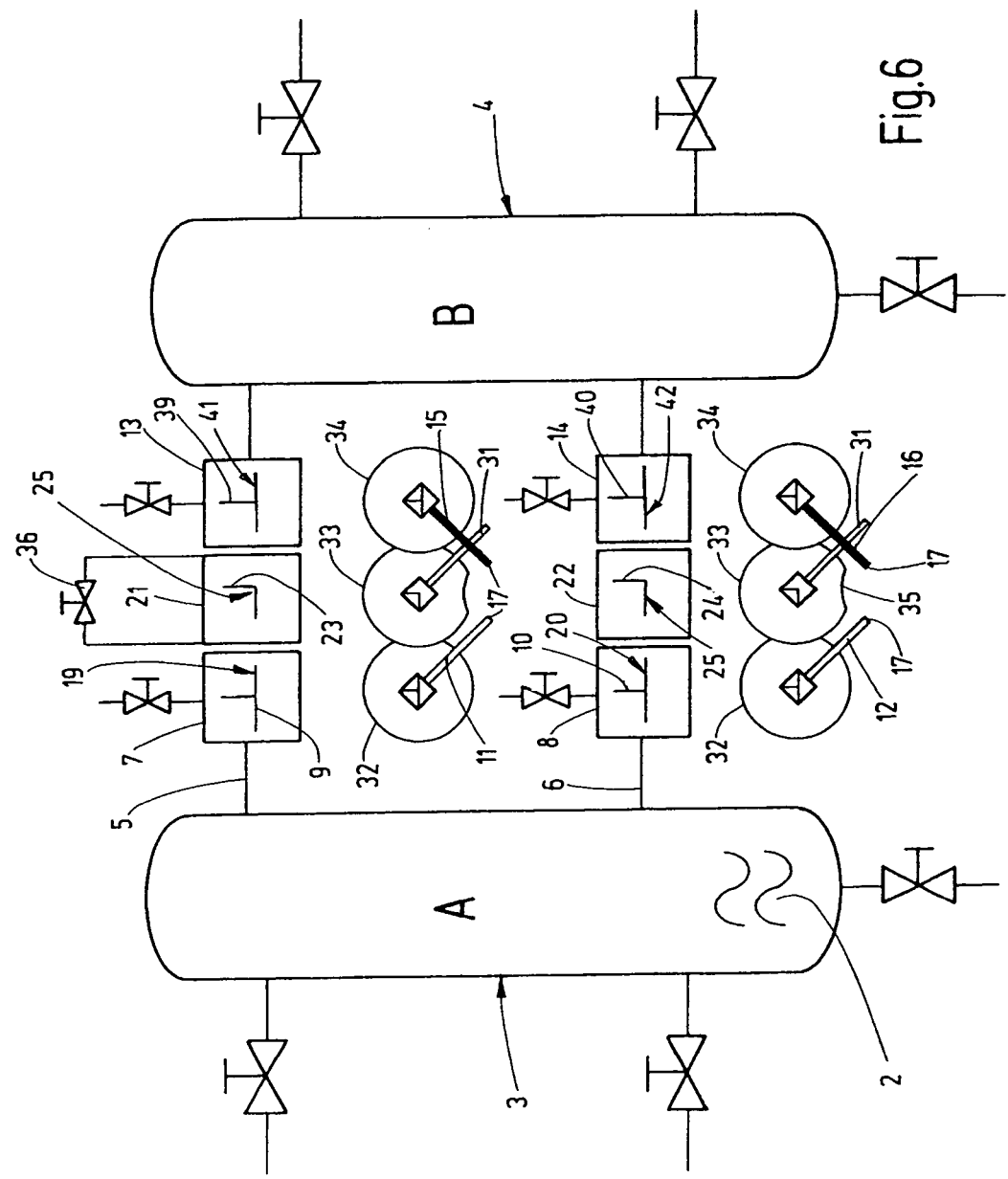

In the operating position according to FIG. 6, the pressure compensation operation is completed. The second treatment device 4 is now completely filled with fluid 2 and is under operating pressure.

Figure 7:
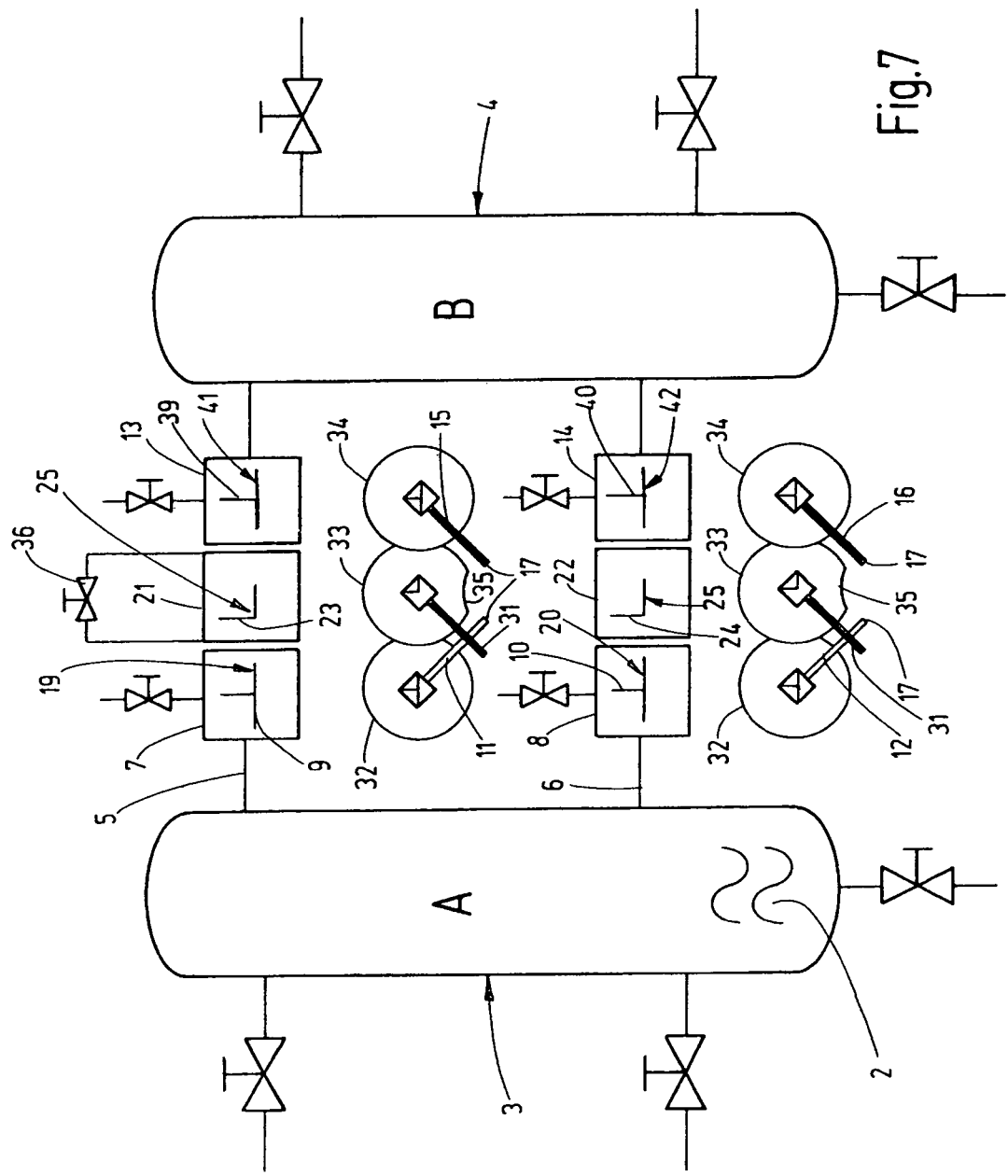

FIG. 7 shows the switchover from the operation of the first treatment device 3 to the operation of the second treatment device 4. For this purpose, the additional switching lever 31 on the shaft 30 is pivoted from right to left, when viewed in the direction of FIG. 7. The result in this case is that the additional switching lever 31 crosses over the pair of switching levers 11, 12, but this crossover does not result in a collision due to the inventive arrangement of the pair of switching levers 11, 12 in a plane that is different from the plane of the additional switching lever 31. Thus, the fifth and the sixth valve 21, 2.2 guide the fluid flow to the second treatment device 4, which is now traversed by the fluid 2. Although the first treatment device 3 is still under pressure, flow can no longer occur therein.

Figure 8:
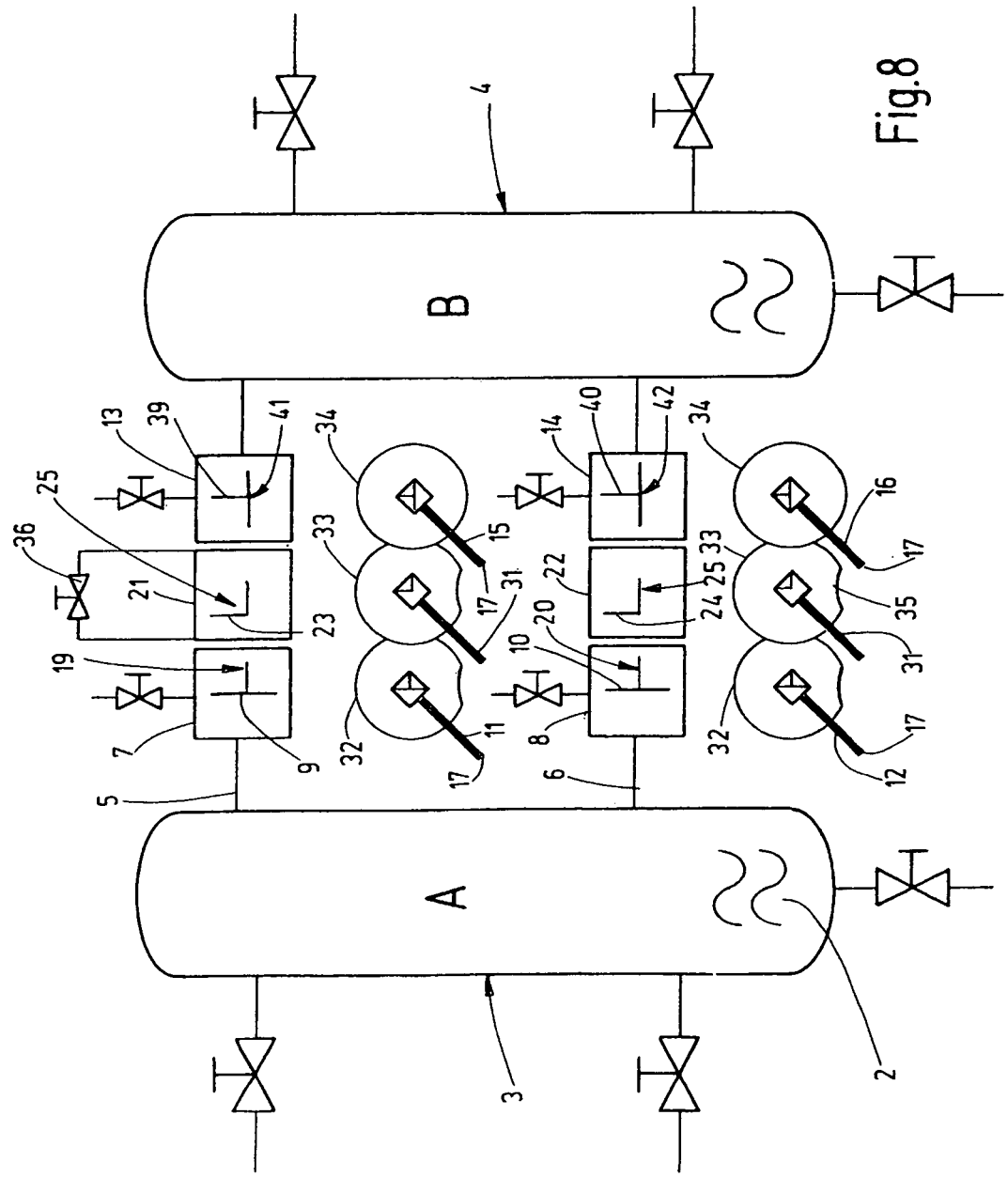

In FIG. 8, the additional shutoff of the first treatment device 3 is performed by pivoting the pair of switching levers 11, 12 from right to left, which will become apparent when comparing the top views from FIGS. 7 and 8.

Figure 9:
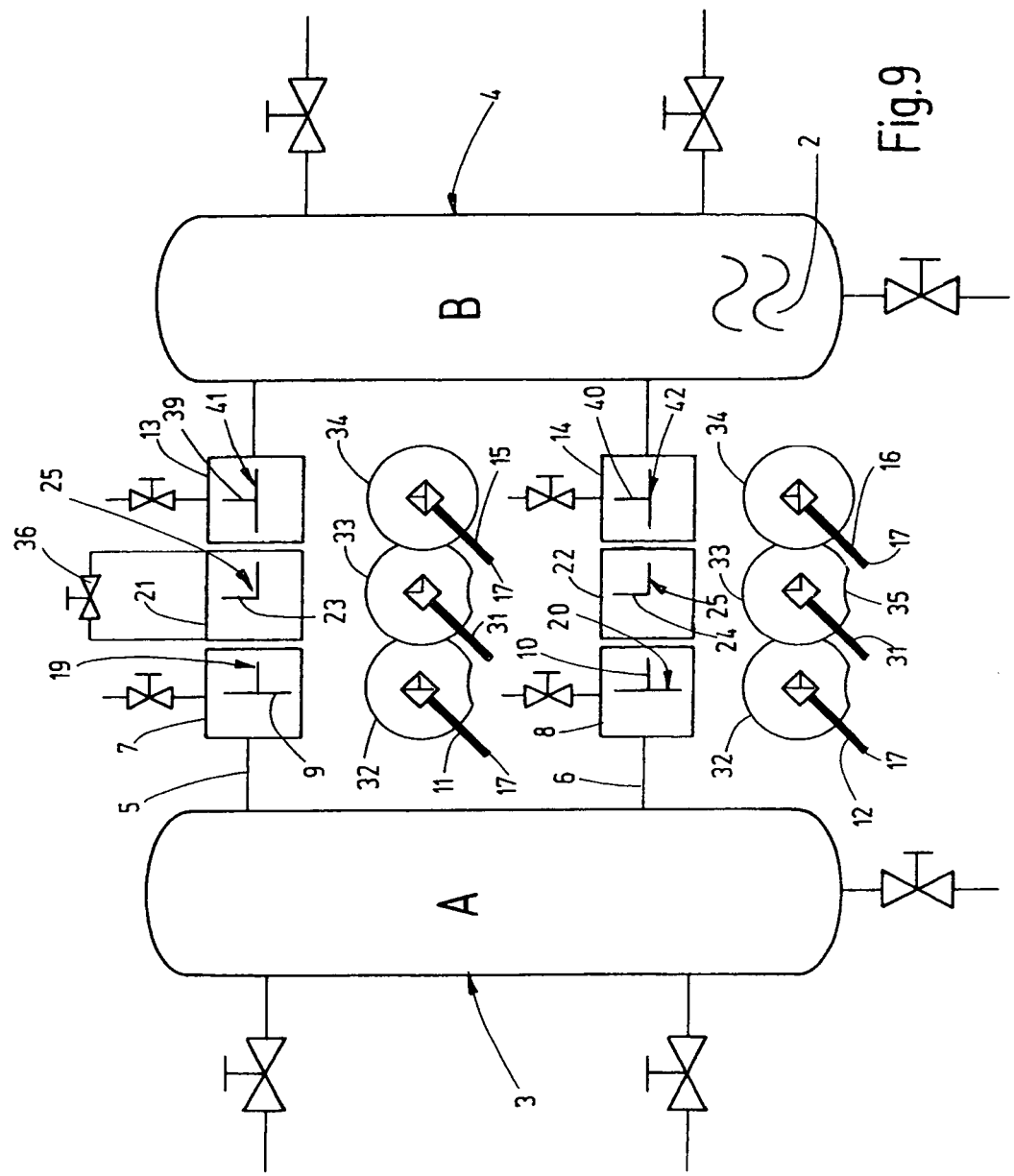

FIG. 9 shows the lowering of the pressure in the first treatment device 3. The switching symbols drawn on the valve elements 9, 10, 23, 24, 39, 40 show the respective switching operation in a clear and obvious fashion to the viewer.

While various embodiments have been chosen to illustrate the invention, it will be understood by those skilled in the art that various changes and modifications can be made therein without departing from the scope of the invention as defined in the appended claims.

What is claimed is:

1. A switching apparatus for controlling fluid flow for at least one of chemical or physical process steps, comprising:
   first and second treatment devices;
   first and second fluid-conducting connections extending between said first and second treatment devices;
   first and third distributor valves in said first fluid-conducting connection;
   second and fourth distributor valves in said second fluid-conducting connection; and
   first, second, third and fourth switching levers being independently operable relative to one another in all positions thereof and being coupled to and operating to vary said first, second, third and fourth distributor valves, respectively, said first and second switching levers forming a first pair arranged in a first plane, said third and fourth switching levers forming a second pair arranged in a second plane different from said first plane such that said switching levers of each of said first and second pairs can be actuated by an operator without being impeded by the switching levers of the other of said first and second pairs.

2. A switching device according to claim 1 wherein
   each said switching lever actuates the respective distributor valve between a fluid-passing position and a fluid-blocking position;
   said first pair defines a first pivoting range for said first and second switching levers;

said second pair defines a second pivoting range for said third and fourth switching levers, said first and second pivoting ranges overlapping in projection, and said first and second pairs being arranged in said first and second planes that are different allowing each of said first and second pairs to move in the respective pivoting ranges to any actuated position thereof in a collision-free manner.

3. A switching device according to claim 2 wherein
said switching levers in each of said first and second pairs are arranged such that the switching levers of each said pair can be jointly actuated over the respective pivoting range entirely with only one hand of an operator.

4. A switching device according to claim 1 wherein
each said switching lever comprises a spacer section being bent relative to a free end thereof and extending substantially in an axis of rotation of the respective distributor valve to arrange said switching levers in different planes.

5. A switching device according to claim 4 wherein
said spacer sections of said switching levers of each of said first and second pairs having different longitudinal extensions.

6. A switching device according to claim 5 wherein
said first and fourth switching levers are designed as identical parts; and
said second and third switching levers are designed as identical parts.

7. A switching device according to claim 1 wherein
each said switching lever comprises two arms arranged diametrically opposite one another relative to an axis of rotation of the respective distributor valve, each of said arms being graspable by an operator.

8. A switching device according to claim 1 wherein
a fifth valve is arranged between said first and third distributor valves in said first fluid conducting connection; and
a sixth valve is arranged between said second and fourth distributor valves in said second fluid-conducting connection.

9. A switching device according to claim 8 wherein
said fifth and sixth valves are coupled by and jointly activated by a shaft; and
an additional switching lever engages said shaft and is in a plane different from said first and second planes of said first and second pairs such that said additional switching lever can move in a pivoting range to any actuated position thereof in a collision-free manner relative to pivoting of said first, second, third and fourth switching levers.

10. A switching device according to claim 9 wherein
said additional switching lever comprises an rod at least partially penetrating and being guided in a receptacle, and extending transversely to a longitudinal extension of said shaft so that said additional switching lever can be moved into opposite operating positions.

11. A switching device according to claim 9 wherein
said sixth valve controls inflow of fluid in said second fluid-conducting connection from a process side; and
said first, second, third, fourth and additional switching levers are actuatable from an operator side opposite the process side by an operator.

12. A switching device according to claim 1 wherein
said switching levers of each said pair are spaced and disengaged from one another in all positions thereof.

* * * * *